(12) United States Patent
Son

(10) Patent No.: US 9,290,168 B2
(45) Date of Patent: Mar. 22, 2016

(54) FIXING STRUCTURE FOR REINFORCEMENT PLATE AND TIE ROD-TYPE BRAKE BOOSTER HAVING THE SAME

(71) Applicant: MANDO CORPORATION, Pyeongtaek-si (KR)

(72) Inventor: Young Jun Son, Pyeongtaek-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 400 days.

(21) Appl. No.: 13/907,377

(22) Filed: May 31, 2013

(65) Prior Publication Data

US 2013/0319218 A1    Dec. 5, 2013

(30) Foreign Application Priority Data

May 31, 2012 (KR) .......................... 10-2012-0058121

(51) Int. Cl.
   *F15B 9/10*      (2006.01)
   *B60T 13/52*     (2006.01)
   *B60T 13/567*    (2006.01)

(52) U.S. Cl.
   CPC ............... *B60T 13/52* (2013.01); *B60T 13/567* (2013.01); *B60T 13/5675* (2013.01)

(58) Field of Classification Search
   CPC ........................... B60T 13/567; B60T 13/5675
   USPC ........................................................ 91/376 R
   See application file for complete search history.

(56) References Cited

U.S. PATENT DOCUMENTS

| 4,557,179 | A | * | 12/1985 | Takeuchi | ............ B60T 13/5675 91/369.2 |
| 6,186,050 | B1 | | 2/2001 | Verbo et al. | |
| 6,623,048 | B2 | | 9/2003 | Castel et al. | |
| 6,651,548 | B1 | * | 11/2003 | Faller | .................. B60T 13/5675 91/369.1 |
| 6,883,415 | B2 | * | 4/2005 | Kawasumi | ............ B60T 13/567 91/376 R |

FOREIGN PATENT DOCUMENTS

| KR | 1999-0059701 | 7/1999 |
| KR | 10-2010-0097786 | 9/2010 |

(Continued)

OTHER PUBLICATIONS

Office Action dated Feb. 16, 2015 for Chinese Patent Application No. 201310207222.6 and its English summary provided by Applicant's foreign counsel.

(Continued)

*Primary Examiner* — Michael Leslie
(74) *Attorney, Agent, or Firm* — Ladas & Parry, LLP

(57) ABSTRACT

A tie rod-type brake booster including a casing provided with a front cell and a rear cell, the front cell and the rear cell sealingly joining to each other, a tie rod caulked to the rear cell through the casing, a reinforcement plate to closely contact an inner surface of the front cell to enhance rigidity of the casing, the reinforcement plate being provided with a through hole penetrated by the tie rod, and a support member formed at a penetration portion of the front cell penetrated by the tie rod to fix the reinforcement plate, wherein the support member comprises a bent portion bent from the penetration portion of the front cell, and a pressing portion perpendicularly extending from the bent portion with respect to an axial direction of the tie rod.

5 Claims, 4 Drawing Sheets

(56) References Cited

FOREIGN PATENT DOCUMENTS

| | | |
|---|---|---|
| KR | 10-2011-0125141 | 11/2011 |
| KR | 10-2012-0026166 | 3/2012 |

OTHER PUBLICATIONS

Office Action dated Mar. 13, 2015 for Korean Patent Application No. 10-2012-0058121.

* cited by examiner

FIXING STRUCTURE FOR REINFORCEMENT PLATE AND TIE ROD-TYPE BRAKE BOOSTER HAVING THE SAME

CROSS-REFERENCE TO RELATED APPLICATION

This application claims priority from Korean Patent Application No. 10-2012-0058121, filed on May 31, 2012 in the Korean Intellectual Property Office, the disclosure of which is incorporated herein by reference in its entirety.

BACKGROUND

1. Field

Embodiments of the present invention relate to a fixing structure for a reinforcement plate which allows the reinforcement plate to be easily fixed to a front cell and a tie-rod type brake booster having the same.

2. Description of the Related Art

In general, a brake booster for a vehicle is a device that produces large braking force from small force using a pressure difference between a vacuum and ambient air.

A conventional brake booster includes a casing provided with a front cell and a rear cell, an input shaft installed across the center of the casing and engaging with a brake pedal, and an output shaft receiving displacement force according to operation of the input shaft. In addition, the inside of the casing is divided into a constant pressure chamber and a variable pressure chamber by a diaphragm and a power piston.

Installed inside the front cell and the rear cell is a tie-rod which supports the front cell and the rear cell to prevent deformation of the front cell by reaction force from a master cylinder attached to the front portion of the front cell and guides movement of the diaphragm and the power piston which operate inside. One end of the tie rod is joined to the master cylinder through the front cell and the other end of the tie rod is installed, through the rear cell, at a partition plate dividing the engine room in the vehicle from a driver's seat.

Such a brake booster is a tie rod-type brake booster which fastens the master cylinder directly to the tie rod and caulks the tie rod to the rear cell to secure sealing performance.

In addition, the tie rod-type brake booster allows the tie rod to directly receive reaction force from the master cylinder, and therefore may not require a reinforcement plate for the front cell.

However, as the thickness of a front cell has been reduced and the material thereof has been changed in recent years to reduce component weight, deformation of a front cell has become an issue of concern.

Thereby, a reinforcement plate may need to be installed at the front cell. However, in the case of a tie rod-type brake booster, a tie rod is caulked to the rear cell, and therefore fixing the reinforcement plate to the front cell may be difficult. That is, as the reinforcement plate needs to be caulked to the front cell, work with the reinforcement plate may be difficult and result in a complicated structure and increase in manufacturing costs.

SUMMARY

Therefore, it is an aspect of the present invention to provide a fixing structure for a reinforcement plate allowing a reinforcement plate to be easily fixed to a front cell and a tie rod-type brake booster having the same.

Additional aspects of the invention will be set forth in part in the description which follows and, in part, will be obvious from the description, or may be learned from practice of the invention.

In accordance with one aspect of the present invention, a tie rod-type brake booster to produce a large braking force using a small force includes a casing provided with a front cell and a rear cell, the front cell and the rear cell sealingly joining to each other, a tie rod caulked to the rear cell through the casing, a reinforcement plate to closely contact an inner surface of the front cell to enhance rigidity of the casing, the reinforcement plate being provided with a through hole penetrated by the tie rod, and a support member formed at a penetration portion of the front cell penetrated by the tie rod to fix the reinforcement plate, wherein the support member may be provided with a bent portion bent from the penetration portion of the front cell, and a pressing portion perpendicularly extending from the bent portion with respect to an axial direction of the tie rod.

The pressing portion may press a rear surface of the reinforcement plate through the through hole of the reinforcement plate.

The bent portion bent from the penetration portion of the front cell may have a diameter corresponding to a diameter of the tie rod.

In accordance with another aspect of the present invention, a tie rod-type brake booster to produce a large braking force using a small force includes a casing provided with a front cell and a rear cell, the front cell and the rear cell sealingly joining to each other, a tie rod caulked to the rear cell through the casing, a reinforcement plate to closely contact an inner surface of the front cell to enhance rigidity of the casing, the reinforcement plate being provided with a through hole penetrated by the tie rod, and a support member formed in the through hole to fix the reinforcement plate to the front cell, wherein the support member may be provided with a bent portion bent from the through hole of the reinforcement plate, and a pressing portion perpendicularly extending from the bent portion with respect to an axial direction of the tie rod.

The pressing portion may press a front surface of the front cell through a penetration portion of the front cell penetrated by the tie rod.

The bent portion bent from the through hole of the reinforcement plate may have a diameter corresponding to a diameter of the tie rod.

In accordance with another aspect of the present invention, provided is a fixing structure for a reinforcement plate and a front cell penetrated by a tie rod, wherein a through hole penetrated by the tie rod is formed at the reinforcement plate, and a penetration portion penetrated by the tie rod is formed at the front cell, wherein the fixing structure may be formed by bending to allow the penetration portion to pass through the through hole to press a periphery of the through hole against a rear surface of the reinforcement plate.

In accordance with another aspect of the present invention, provided is a tie rod-type brake booster to produce a large braking force using a small force, wherein a through hole penetrated by the tie rod is formed at the reinforcement plate, and a penetration portion penetrated by the tie rod is formed at the front cell, wherein the fixing structure may be formed by bending to allow the through hole to pass through the penetration portion to press a periphery of the penetration portion against a front surface of the reinforcement plate.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
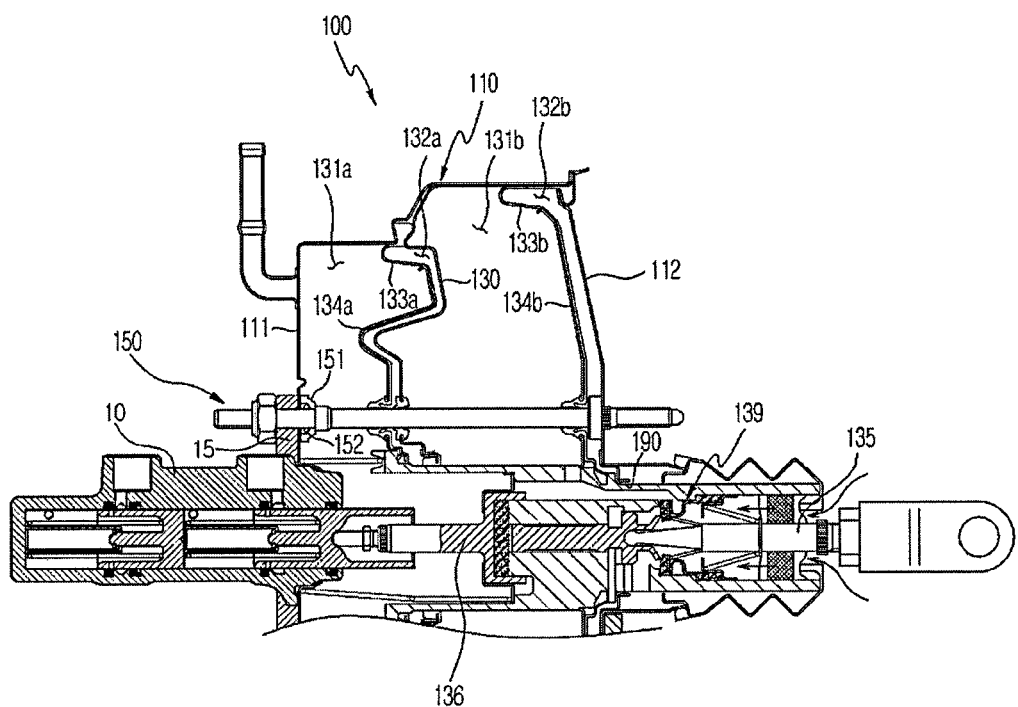
FIG. 1 is a cross-sectional view showing a tie rod-type brake booster according to an exemplary embodiment of the present invention.

Reference will now be made in detail to the embodiments of the present invention, examples of which are illustrated in the accompanying drawings. It should be understood that the terms used in the specification and appended claims should not be construed as limited to general and dictionary meanings but should be construed based on the meanings and concepts according to the spirit of the present invention on the basis of the principle that the inventor is permitted to define appropriate terms for best explanation. The preferred embodiments described in the specification and shown in the drawings are only illustrative and are not intended to represent all aspects of the invention, such that various equivalents and modifications may be made without departing from the spirit of the invention.

FIG. 1 is a cross-sectional view showing a tie rod-type brake booster according to an exemplary embodiment of the present invention.

Referring to FIG. 1, a tie rod-type brake booster 100 includes a casing 110 sealed by coupling between a front cell 111 and a rear cell 112, an intermediate plate 130 dividing an inside of the sealed casing 110 into a front space and a rear space, diaphragms 133a and 133b respectively installed in both spaces divided by the intermediate plate 130 to divide the inner space into constant pressure chambers 131a and 131b and variable pressure chambers 131a and 131b, and power pistons 134a and 134b.

An opening 119 is formed at the center of the rear surface of the casing 110. A valve unit 139 is installed in the opening 119 to produce pressure difference between the constant pressure chambers 131a and 131b and the variable pressure chambers 131a and 131b by moving forward and backward according to operation of an input shaft 135 connected with a brake pedal (not shown) to cause the constant pressure chambers 131a and 131b to communicate with the variable pressure chambers 131a and 131b or to cause the two variable pressure chambers 131a and 131b to communicate with the ambient air. The pressure difference caused by the operation of the input shaft 135 is transferred to an output shaft 136. Then, the output shaft 136 pushes a piston of a master cylinder 10 fixed to an outer lateral surface of the front portion of the front cell 111 to produce braking force.

The master cylinder 10 is formed in the shape of a circular cylinder having one end which is closed and the other end which is open. The master cylinder 10 is adapted to receive force through the output shaft 136 to produce hydraulic pressure. The master cylinder 10 is well known to those skilled in the art, and therefore a detailed description thereof will be omitted.

The master cylinder 10 is provided with a flange 15 to be coupled to the booster 100 by a tie rod 150, which will be described later.

The tie rod 150 is installed through the casing 110 to prevent separation between the front cell 111 and the rear cell 112. One end of the tie rod 150 is exposed outside through the front cell 111 and joined to the flange 15 of the master cylinder 10. The other end of the tie rod 150 is exposed outside by passing through the power pistons 134a and 134b and through the diaphragms 133a and 133b and the rear cell 112 and installed at a partition plate (not shown) which partitions a driver's seat from an engine room. At this time, the tie rod 150 is caulked to the rear cell 112. Thereby, the tie rod 150 supports the front cell 111 and the rear cell 112 to prevent deformation of the front cell 111 by reaction force from the master cylinder 10 attached to the front portion of the front cell 111 and guides movement of the diaphragms 133a and 133b and the power pistons 134a and 134b which internally operate.

Figure 2:
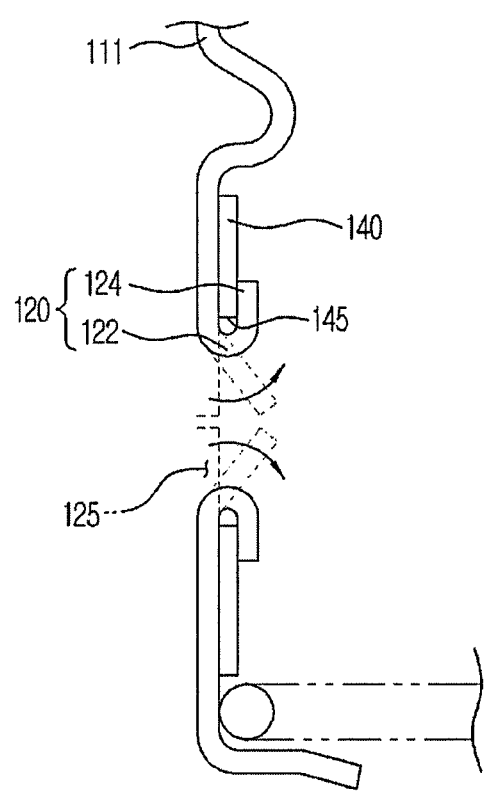
FIG. 2 is a partially enlarged view showing a fixing structure for a reinforcement plate provided to the tie rod-type brake booster according to the embodiment of the present invention.
Figure 3:
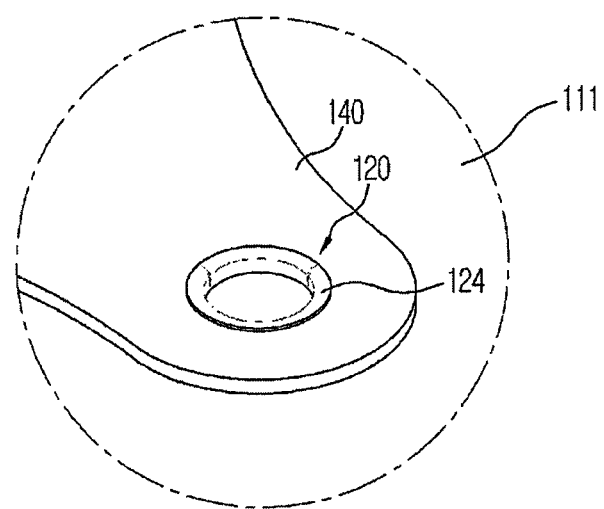
FIG. 3 is a partial perspective view showing the inner surface of a front cell of the tie rod-type brake booster according to the embodiment of the present invention.

A reinforcement plate 140 to prevent deformation of the front cell 111 is installed at the front cell 111 of the booster. According to the illustrated embodiment, the front cell 111 is provided with a support member 120 to fix the reinforcement plate 140. The support member 120 is formed in a hem shape at a penetration portion 125 of the front cell 111 which the tie rod 150 penetrates. More specifically, as shown in FIG. 2, for the fixing structure for the reinforcement plate 140 and the front cell 111, the support member 120 is formed at the front cell 111 to fix the reinforcement plate 140 closely contacting the inner surface of the front cell 111. The support member 120 is provided with a bent portion 122 bent from the penetration portion 125, which is the portion that is penetrated by the tie rod 150, and a pressing portion 124 perpendicularly extending from the bent portion 122 with respect to the axial direction of the tie rod 150. The reinforcement plate 140 is provided with a through hole 145 through which the tie rod 150 passes. The pressing portion 124 passes through the through hole 145 and then presses the periphery of the through hole 145 against the rear surface of the reinforcement plate 140. Thereby, the reinforcement plate 140 is fixed. That is, the reinforcement plate 140 is fixed by the support member 120 formed by bending of the front cell 111. Here, the diameter of the bent portion 122, which is formed by bending the penetration portion 125, may correspond to that of the tie rod 150.

Reference numeral '151' indicates a washer installed on the outer circumferential surface of the tie rod 150, and reference numeral '152' indicates a sealing member provided between the tie rod 150 and the washer 151 to seal the gap between the front cell 111 and the tie rod 150.

As the reinforcement plate 140 is fixed not by being caulked to the front cell 111, as in conventional cases, but by bending the front cell 111 in a hem shape, the reinforcement plate 140 may be easily fixed.

Additionally, while the reinforcement plate 140 is illustrated as being fixed to the front cell 111 by the support member 120 formed by bending the front cell 111 in a hem shape, embodiments of the present invention are not limited thereto. The reinforcement plate 140 may be bent to be fixed to the front cell 111.

Figure 4:
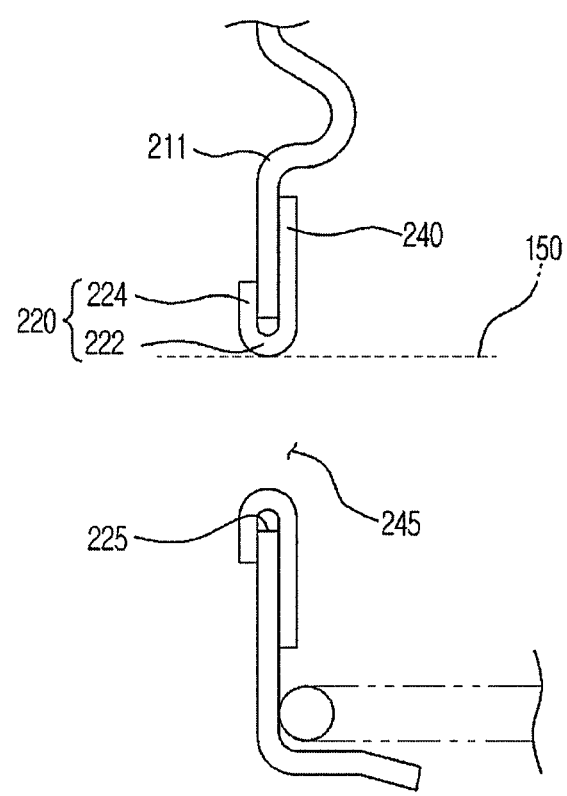
FIG. 4 is a partially enlarged view showing a fixing structure for a reinforcement plate provided to a tie rod-type brake booster according to another embodiment of the present invention.

For example, FIG. 4 shows a fixing structure for a reinforcement plate 240 and a front cell 211 according to another embodiment of the present invention. The other constituents except the fixing structure for the reinforcement plate 240 and the front cell 211 perform the same functions and operations as corresponding ones of the previous embodiment. Therefore a detailed description thereof will be omitted. Referring to FIG. 4, a support member 220 having a hem shape is formed at a through hole 245 of the reinforcement plate 240 penetrated by the tie rod 150 and fixed to the front cell 211. That is, the support member 220 is formed at the through hole 245 of the reinforcement plate 240 facing a penetration portion 225 of the front cell 211 penetrated by the tie rod 150. The support member 220 is provided with a bent portion 222 bent from the through hole 245 and a pressing portion 224 extending from the bent portion 222 in a bending manner to press the front side of the front cell 211. For the support member 220, the pressing portion 224 passes through the penetration portion 225 and then presses the periphery of the penetration portion 225 against the front surface of the front cell 211, thereby having a hem shape as in the previous embodiment.

Here, the diameter of the bent portion 222 bent around the through hole 245 may correspond to that of the tie rod 150.

As the reinforcement plates 140 and 240 are easily fixed to the front cells 111 and 211 through the fixing structures for the reinforcement plates 140 and 240, the reinforcement plates 140 and 240 may be easily fixed compared to the conventional joining manner of caulking, the structure and process of installation may be simplified and assembly costs may be reduced.

As is apparent from the above description, for a fixing structure for a reinforcement plate and a tie rod-type brake booster having the same according the present invention, the reinforcement plate is installed at the front cell to have a hem shape, the reinforcement plate may be more easily installed than in the conventional caulking process, and therefore the installation structure may be simplified. In addition, as the installation process is simplified, assembly costs are reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A tie rod-type brake booster to produce a large braking force using a small force, comprising:
   a casing provided with a front cell and a rear cell, the front cell and the rear cell sealingly joining to each other;
   a tie rod caulked to the rear cell through the casing;
   a reinforcement plate to closely contact an inner surface of the front cell to enhance rigidity of the casing, the reinforcement plate being provided with a through hole penetrated by the tie rod; and
   a support member formed at a penetration portion of the front cell penetrated by the tie rod to fix the reinforcement plate,
   wherein the support member is provided with a bent portion bent from the penetration portion of the front cell, and a pressing portion perpendicularly extending from the bent portion with respect to an axial direction of the tie rod, and
   wherein the pressing portion presses a front surface of the front cell through a penetration portion of the front cell penetrated by the tie rod.

2. The tie rod-type brake booster according to claim 1, wherein the bent portion bent from the penetration portion of the front cell has a diameter corresponding to a diameter of the tie rod.

3. A tie rod-type brake booster to produce a large braking force using a small force, comprising:
   a casing provided with a front cell and a rear cell, the front cell and the rear cell sealingly joining to each other;
   a tie rod caulked to the rear cell through the casing;
   a reinforcement plate to closely contact an inner surface of the front cell to enhance rigidity of the casing, the reinforcement plate being provided with a through hole penetrated by the tie rod; and
   a support member formed in the through hole to fix the reinforcement plate to the front cell,
   wherein the support member is provided with a bent portion bent from the through hole of the reinforcement plate, and a pressing portion perpendicularly extending from the bent portion with respect to an axial direction of the tie rod, and
   wherein the pressing portion presses a front surface of the front cell through a penetration portion of the front cell penetrated by the tie rod.

4. The tie rod-type brake booster according to claim 3, wherein the bent portion bent from the through hole of the reinforcement plate has a diameter corresponding to a diameter of the tie rod.

5. A tie rod-type brake booster to produce a large braking force using a small force, wherein:
   a through hole penetrated by a tie rod is formed at a reinforcement plate; and
   a penetration portion penetrated by the tie rod is formed at a front cell,
   wherein a fixing structure is formed by bending to allow the through hole to pass through the penetration portion to press a periphery of the penetration portion against a front surface of the front cell, and
   wherein a pressing portion presses a front surface of the front cell through a penetration portion of the front cell penetrated by the tie rod.

* * * * *